US009294876B2

(12) United States Patent
Haro et al.

(10) Patent No.: US 9,294,876 B2
(45) Date of Patent: Mar. 22, 2016

(54) APPARATUS AND METHOD FOR GENERATING, DISPLAYING AND IMPLEMENTING A GEO-FENCE USING LOCATION DETERMINATION OF MOBILE DEVICES WITHIN A LOCATION-BASED GROUP

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 0 days.

(21) Appl. No.: 14/267,801

(22) Filed: May 1, 2014

(65) Prior Publication Data
US 2015/0319568 A1 Nov. 5, 2015

(51) Int. Cl.
H04W 24/00 (2009.01)
H04B 1/04 (2006.01)
H04W 4/02 (2009.01)

(52) U.S. Cl.
CPC .............. *H04W 4/021* (2013.01); *H04W 4/02* (2013.01)

(58) Field of Classification Search
CPC .......................... H04W 4/02; G06F 17/30595
USPC ....................................... 455/456.1
See application file for complete search history.

(56) References Cited

U.S. PATENT DOCUMENTS

| 7,493,211 B2 | 2/2009 | Breen |
| 7,498,985 B1 | 3/2009 | Woo et al. |
| 8,018,329 B2 | 9/2011 | Morgan et al. |
| 8,164,431 B2 | 4/2012 | Morgan et al. |

(Continued)

FOREIGN PATENT DOCUMENTS

WO 2014031906 A1 2/2014

OTHER PUBLICATIONS

PCT/US15/19422, "Notification of Transmittal of the International Search Report and the Written Opinion of the International Searching Authority, or the Declaration", mailed Jun. 19, 2015.

*Primary Examiner* — Thomas Lett
(74) *Attorney, Agent, or Firm* — Blakely Sokoloff Taylor & Zafman LLP (57) ABSTRACT

Method of generating, displaying, and implementing geo-fence using location determination of mobile devices (MHSDs) within location-based group starts with server receiving geo-fence information and generating geo-fence based on geo-fence information. Server receives location data and proximity information from MHSDs. Location data received from first MHSD includes first MHSD's location. Proximity information received from first MHSD includes identification of MHSDs within proximity sensitivity radius of first MHSD's location. Server forms subgroup of MHSDs based on proximity information from each MHSD. Subgroup include first MHSD and MHSDs that have provided proximity information that identifies first MHSD are being within proximity sensitivity radiuses of the MHSDs, respectively. Server refines the fixed location of the first MHSD, which includes identifying an intersection of the proximity sensor sensitivity of MHSDs that are in subgroup. Server generates and transmits alert to display device when refined location of first MHSD crosses the geo-fence. Other embodiments are described.

19 Claims, 8 Drawing Sheets

(56) References Cited

U.S. PATENT DOCUMENTS

| | | |
|---|---|---|
| 8,217,772 B2 | 7/2012 | Morgan et al. |
| 8,325,025 B2 | 12/2012 | Morgan et al. |
| 8,362,887 B2 | 1/2013 | Morgan et al. |
| 8,428,098 B2 | 4/2013 | Chen et al. |
| 8,433,324 B2 | 4/2013 | Tang |
| 8,436,773 B2 | 5/2013 | Seibert |
| 8,436,901 B2 | 5/2013 | Uhm |
| 8,437,972 B2 | 5/2013 | Ploplys et al. |
| 8,438,156 B2 | 5/2013 | Redstone et al. |
| 8,471,701 B2 | 6/2013 | Yariv et al. |
| 8,508,349 B2 | 8/2013 | Morgan et al. |
| 8,581,712 B2 | 11/2013 | Morgan et al. |
| 8,581,713 B1 | 11/2013 | Morgan et al. |
| 8,666,373 B2 | 3/2014 | Dessouky et al. |
| 2008/0268869 A1 | 10/2008 | Lamba et al. |
| 2009/0009398 A1 | 1/2009 | Taylor et al. |
| 2010/0234044 A1 | 9/2010 | Lohbihler |
| 2011/0066398 A1 | 3/2011 | Troxler et al. |
| 2011/0134240 A1 | 6/2011 | Anderson et al. |
| 2011/0171973 A1 | 7/2011 | Beck et al. |
| 2011/0282799 A1 | 11/2011 | Huston |
| 2012/0052884 A1 | 3/2012 | Bogatin |
| 2012/0235865 A1 | 9/2012 | Nath et al. |
| 2012/0246195 A1 | 9/2012 | McFall et al. |
| 2012/0329484 A1 | 12/2012 | Rothschild |
| 2013/0095854 A1 | 4/2013 | Scales |
| 2013/0324166 A1* | 12/2013 | Mian et al. ............ 455/457 |
| 2014/0045529 A1* | 2/2014 | Bolon et al. ............ 455/456.1 |
| 2014/0095296 A1* | 4/2014 | Angell ............ G06Q 30/0246 705/14.45 |

* cited by examiner

APPARATUS AND METHOD FOR GENERATING, DISPLAYING AND IMPLEMENTING A GEO-FENCE USING LOCATION DETERMINATION OF MOBILE DEVICES WITHIN A LOCATION-BASED GROUP

CROSS-REFERENCE TO RELATED APPLICATIONS

This patent application is related to U.S. patent application Ser. No. 14/023,225, filed on Sep. 10, 2013 and the entirety of which is incorporated herein by reference.

FIELD

Embodiments of the invention relate generally to an apparatus and method of generating, displaying and implementing a geo-fence using the location determination of mobile devices within a location-based group.

BACKGROUND

Currently, mobile devices such as smart mobile phones include mapping applications that may be used to show the current location of the user of the mobile device on the mobile device's display. These applications may also be used to navigate the user to a destination based on his current location to the given destination. In some mapping applications, the user's location is tracked and onscreen and audio directions are provided to the user.

However, the functionality of these mapping applications suffers when the user's location cannot be fixed accurately using sensors, WiFi and GPS. For instance, the display of the user's location which cannot be accurately fixed may jump from one location to the next (e.g., rapid phantom jumps) as the user moves. In order for the display of the user's location as he moves to appear as a smooth linear location change, a more accurate location fixing and tracking of the mobile device is needed.

Geo-fences are used to put limits on the movement of tracked mobile devices. When any tracked mobile device is identified as having crossed a set geo-fence, an intimation is passed on to the tracking server for corrective action. Large errors that exist in today's location identification systems make geo-fences unusable for most critical applications. A critical geo-fence application may be one where it is critical to accurately determine whether the geo-fence has been crossed (e.g., monitoring a child's whereabouts with respect to a set perimeter). Accordingly, more accurate location sensing capability is currently needed to allow geo-fencing to be used with critical applications.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Identifying the location of mobile devices has become a need in many applications such as geo-fencing (e.g., creating a virtual perimeter on a map representing a real-world geographic area), geo-location (e.g., assessing the real-world geographic location of an object or user), mobile tracking (e.g., tracking the real-world location of a mobile device) and personal identification, etc. The geo-positioning systems (GPS) using satellites and cell towers (e.g., triangulation method) for location fixing of mobile hand held sensor devices (MHSDs), such as cellular phones, tablet computers and other mobile communication and display-devices, have become more common with the increase in the number of MHSDs and in the accessibility of wireless connectivity. The location identification capability has also improved over the past years but still leave much to be desired. The current location fixing methods use the GPS or triangulation using the local wireless towers and other available fixed sensors to identify and fix the location of a MHSD. The positioning accuracy suffers due to the inaccuracies of the sensors and reflections of the wireless signals due to neighboring structures (e.g., buildings). These cause the display of the identified location to appear to bounce around in a very haphazard way.

Figure 1:
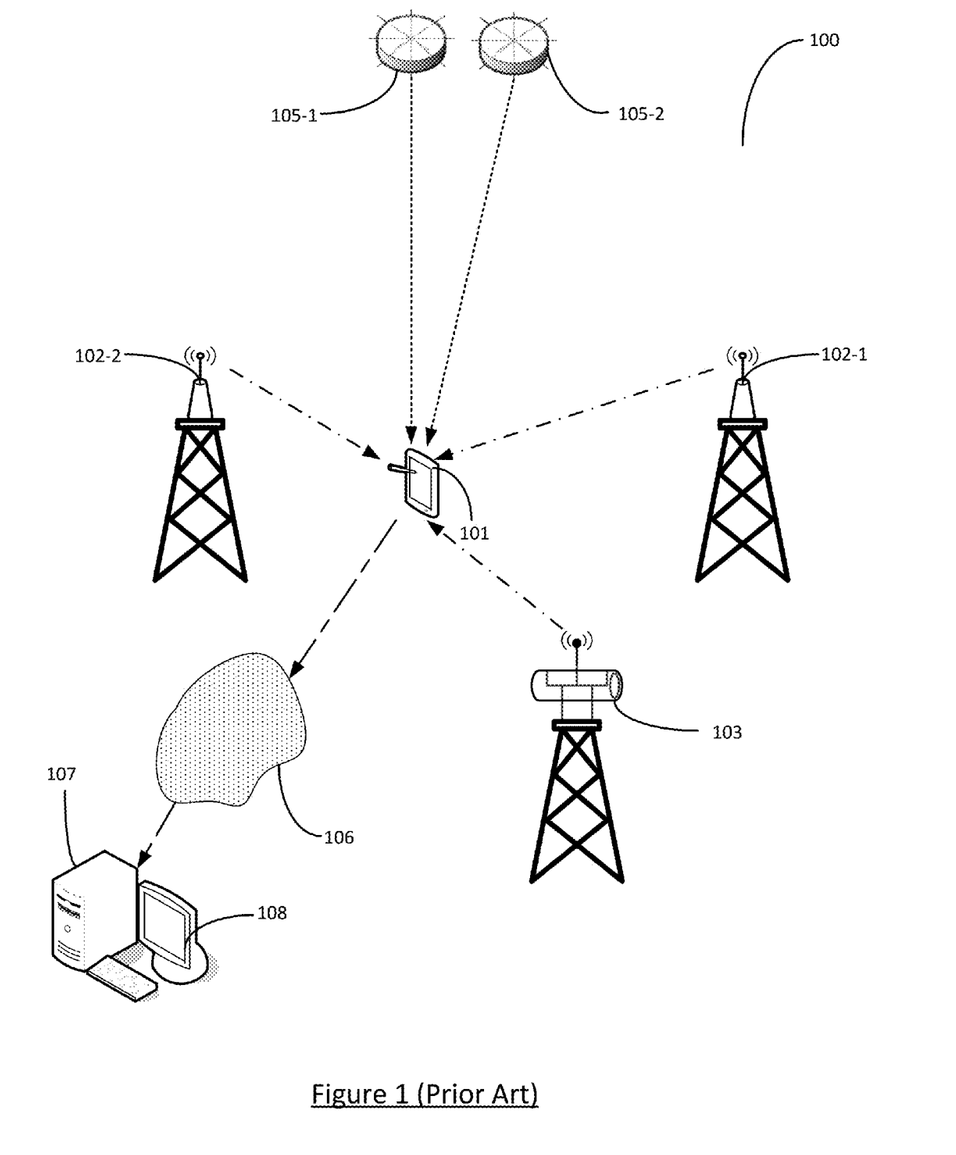
FIG. 1 illustrates a prior art system for tracking and establishing the location of a mobile device (i.e., "location fixing").
Figure 2:
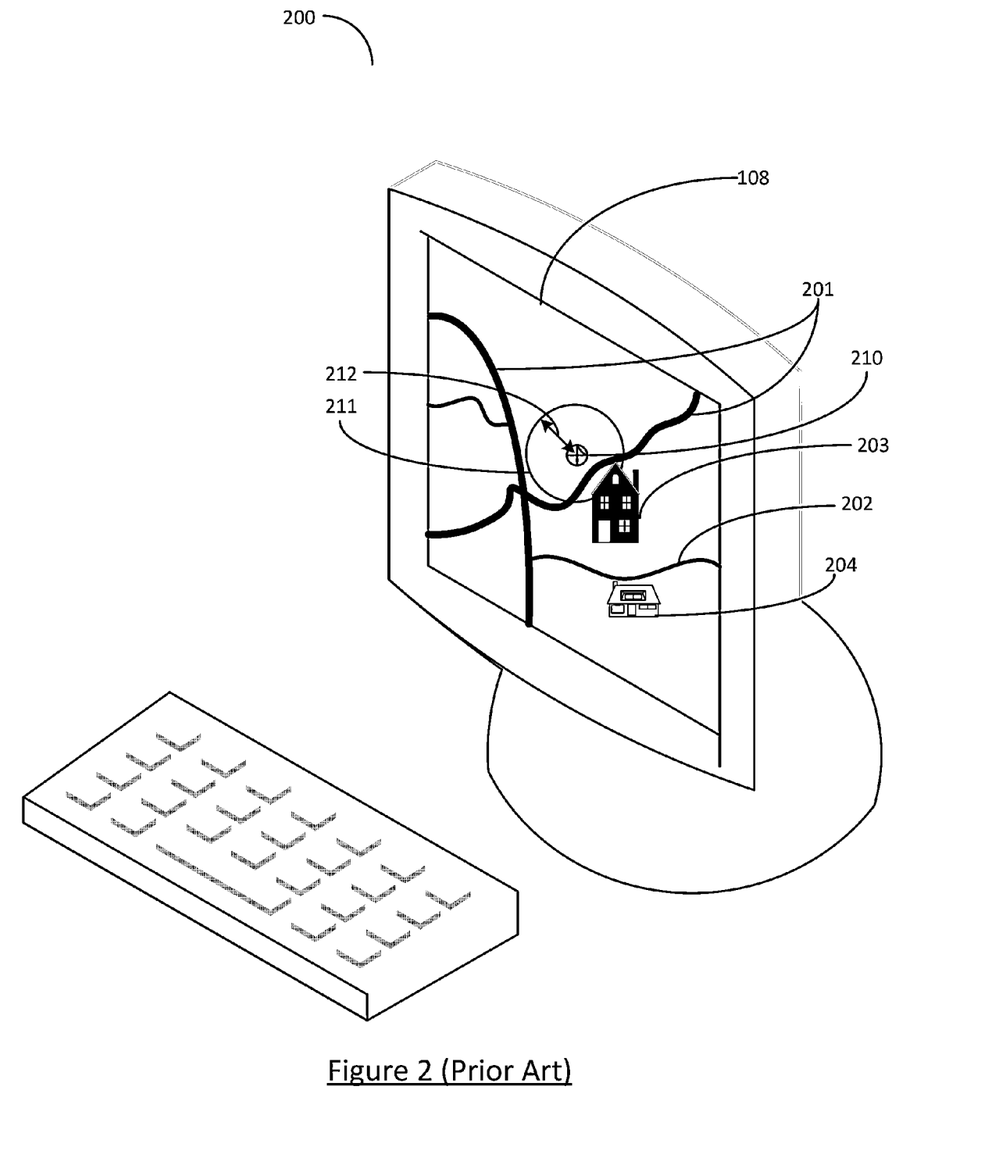
FIG. 2 illustrates the displayed location of the mobile device using the prior art system for tracking the location of a mobile device and location fixing the mobile device.
Figure 3:
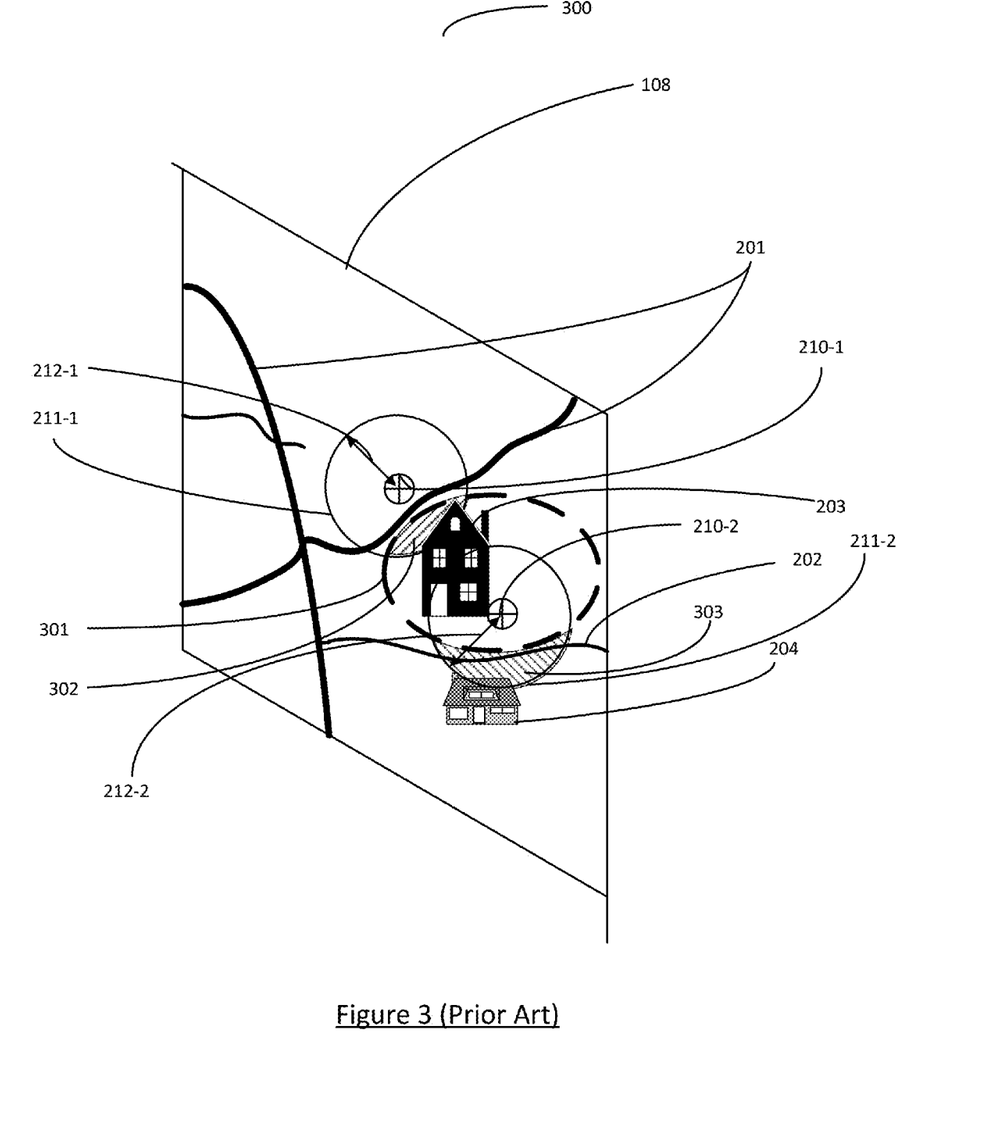
FIG. 3 illustrates the problem of generating, displaying, and implementing a critical geo-fence and the location of the mobile device using the prior art system for tracking the location of the mobile device and the location fixing of the mobile device.

FIG. 1 illustrates a prior art system for tracking and establishing the location of a mobile device (MHSD 101) (i.e., "location fixing"). The system 100 illustrates a mobile device (MHSD) 101 being tracked which may be portable computers such as laptop, notebook, tablet, and handheld computers or may also take the form of other types of devices, such as mobile telephones, media players, personal data organizers, handheld game platforms, cameras, and/or combinations of such devices. The tracking server 107 included in the system 100 links to the registered mobile device 101 over a network 106 (e.g., Cloud Network or Internet) to collect and transfer location data. Specifically, the server 107 requests location data from the MHSD 101 in order to display the location of the MHSD 101 on the display device 108. The MHSD 101 may extract its location data upon receiving the request from the server 107 by using its internal sensors and radios and by connecting to the Global Positioning System (GPS) 105-1 and 105-2. Thus, the GPS satellites 105-1 and 105-2 are used to generate a location fix for the MHSD 101. The MHSD 101 may also extract its location data by using its internal sensors and radios and by triangulation using the Wireless (WiFi) towers 102-1 and 102-2 and/or WiFi base station 103. Thus, the wireless towers 102-1 and 102-2 or the Wi-Fi base stations 103 may also be used to fix the location of the MHSD 101 by triangulation. The use of the GPS 105-1 and 105-2 and the triangulation methods can be combined to improve the location identification of the MHSD 101. This information is transmitted over the network (or cloud) 106 to a tracking and monitoring server (TMSS) 107 where it is displayed on the server display screen 108. The server 107 also ensures that the location information is provided to the MHSD 101 is available for display on the MHSD 101 display screen 108. FIG. 2 illustrates the displayed location of the mobile device (MHSD 101) using the prior art system for tracking the location of a mobile device (MHSD 101) and location fixing the mobile device (MHSD 101). As shown in FIG. 2, the display 200 on a display device 108 includes a representation a map with major roads 201, minor roads 202 and buildings 203 and 204. The map also includes the location 210 of the MHSD 101. In this prior system 100, the location 210 is not accurate but rather it is located within the location fixing accuracy of the MHSD 101's sensor and may further be affected by the reflections from the MHSD 101's surroundings (e.g., buildings). In other words, although the mobile device (MHSD 101) is shown at the location 210, the accuracy of the location 210 is dependent on the sensitivity of the sensors used to fix the location and the bounce range limit of sensing. FIG. 2 illustrates the sensor sensitivity or sensor accuracy limit 211 of the mobile device 101. The possible error in the location of MHSD 101 can be as much as the area within the sensor error radius 212. Accordingly, actual location of the mobile device 101 may be anywhere within the area having an error radius 212. Therefore, even when the mobile device 101 is within the building 203, the location of the mobile device 101 can be shown on display device 108 as being outside of the building 203. In some prior art systems that use this method of location fixing, the fixed position can be as much as 1 to 3 miles from its actual position (e.g., the error margin). A geo-fence is a virtual boundary established around a geographical region, which provides an alert signal when a registered MHSD crosses the geo-fence boundary set. FIG. 3 illustrates the problem of generating, displaying, and implementing a critical geo-fence and the location of the mobile device using the prior art system for tracking the location of the mobile device and the location fixing of the mobile device. As shown in FIG. 3, the prior art system may not be able to generate and display a critical geo-fence 301 that is set up to prevent MHSDs from accessing the roads around the building 203. For instance, this geo-fence 301 in display 300 on a display device 108 may be a child protection scheme to prevent children from crossing the road 201 unsupervised. Due to the large sensor error radius 212-1 and the large sensor error radius 212-2 of the MHSDs used for the location fix, a child represented by the MHSD 210-1 that is outside the geo-fence 301 and as such appears in danger, may be seen as being inside the geo-fence 301 within the safe region 302 of the error radius 212-1. Similarly, a child represented by the MHSD 210-2 who is within the geo-fence 301 may be shown as playing outside the geo-fence 301 within the region 303 due to the large error radius 212-2. In both cases, the geo-fence 301 is not being properly utilized. Further, the sensitivity range and bounce range of a tracked MHSD will make the establishing of an accurate geo-fence difficult because the sensitivity and bounce ranges are not always fixed and hence, the location of the sensed MHSD may appear to bounce in location when the sensed MHSD is near the fence boundary (e.g., in and out of the geo-fence, indiscriminately). This, as described above, may cause false alerts to be registered and real alerts to go unregistered, which may further cause the critical geo-fence applications to be ineffective except for very loosely controlled applications.

It will be useful to have a method and system that can provide a much more accurate location determining capability, with small error radius enabling critical applications of Geo-fencing for many of the current and future uses.

A geo-fence in a mapped area is a virtual boundary created using location sensing technology, used on mobile handheld sensor devices (MHSDs). The geo-fence is generated could be generated as a radius around a location or as a virtual pre-defined geographical set of boundaries such as school attendance zones and neighborhood boundaries for playgrounds, ponds, and swimming pools. When the registered location-aware MHSD enters or exits a geo-fence, the geo-fence system generates a notification. This notification may contain information about the location and movement of the MHSD. The notification is sent to a monitoring server and to a mobile phone or email account for required monitoring or action that was previously provided in connection with the MHSD being tracked. Generation and use of geo-fences today is hampered by the inaccuracies existing in the location fixing process for the target mobile device (MHSD). Specifically, the inaccuracies in the location fixing process may cause phantom jumps to occur which may change displayed locations by as much as 3 miles. Accordingly, these inaccuracies in location fixing can create false alerts and result in incorrect responses and hence, can limit the applicability of the geo-fence for critical applications that require accuracy of sensing. In some embodiments of the invention, a more accurate location fixing method is used to overcome this deficiency. Using historic data regarding the MHSD further assisted by location information from one or more associated groups, implicit or explicit, to which a specific mobile device or group of identifiable mobile devices is associated with a much more accurate fix of the location of a mobile device is done, to enable a viable and accurate geo-fence suitable for critical application. This determination of location is also done based on historical data of the mobile device's prior location fixes at a location identified for better accuracy. This improved location fixing is of particular importance in geo-fencing accuracy (e.g., tendency to bounce in and out) as well as weighting the tendency and accuracy of various location sensors. This improved location fixing, by providing a much smaller sensing error radius is of particular importance and use in critical geo-fencing applications.

More specifically, in one embodiment, the system uses the capability established for a group of pre-registered mobile devices registered with a tracking and monitoring server system (TMSS) to be tracked and monitored for location and associations. Further, the normal locations frequented by the MHSD are collected for each of the registered MHSD and saved with the location information in a historic location database (HL-DB). The database (HL-DB) is used to identify and determine more accurately the location of each of the MHSDs when these locations are found to be within range of the sensors. Identifying the locations of a MHSD with more exactness is the enabler for a more accurate establishment of geo-fences for critical needs of security.

Figure 4:
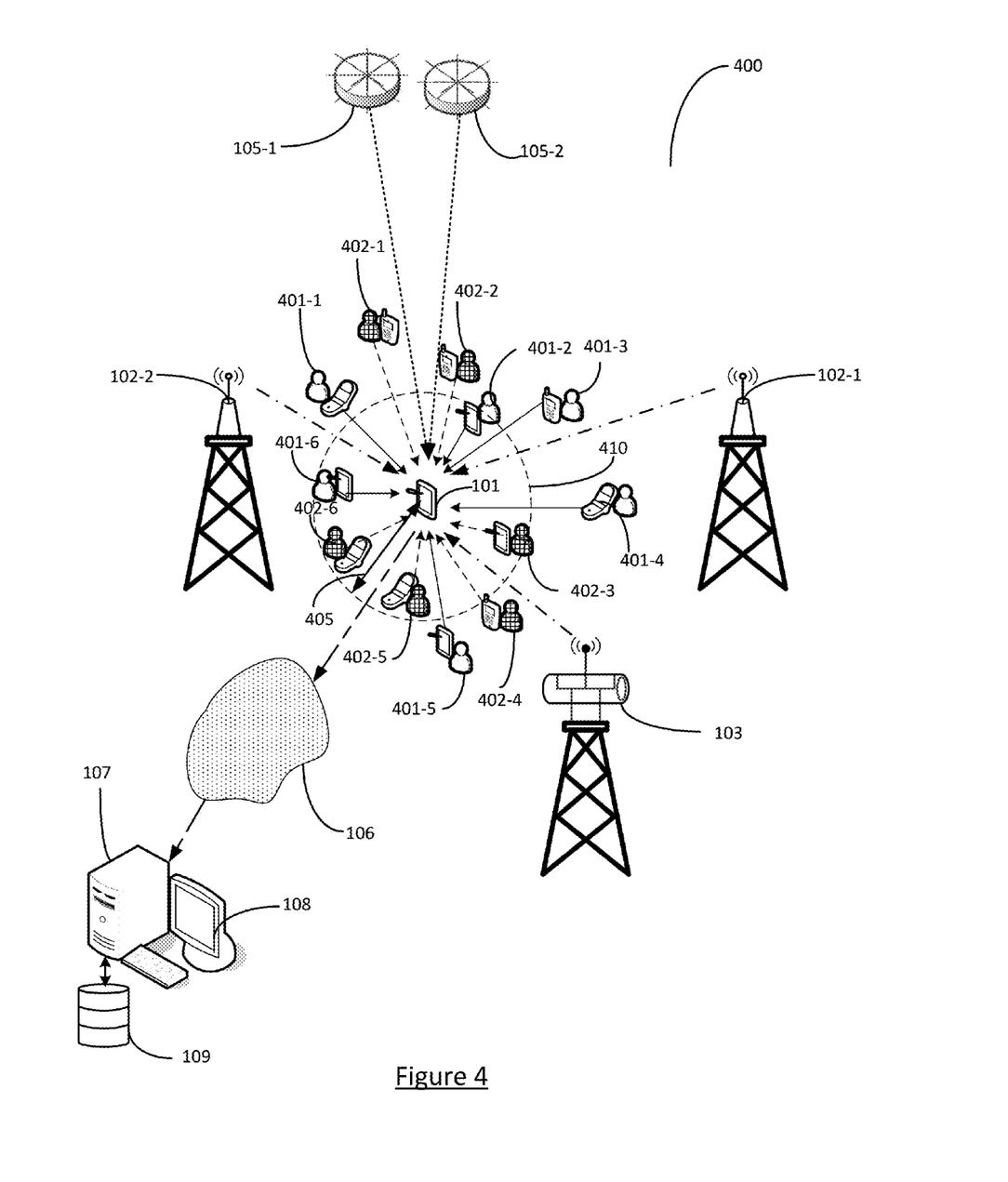
FIG. 4 illustrates a system for generating, displaying, and implementing a geo-fence using the location determination of mobile devices within a location-based group according to an embodiment of the invention.
Figure 5:
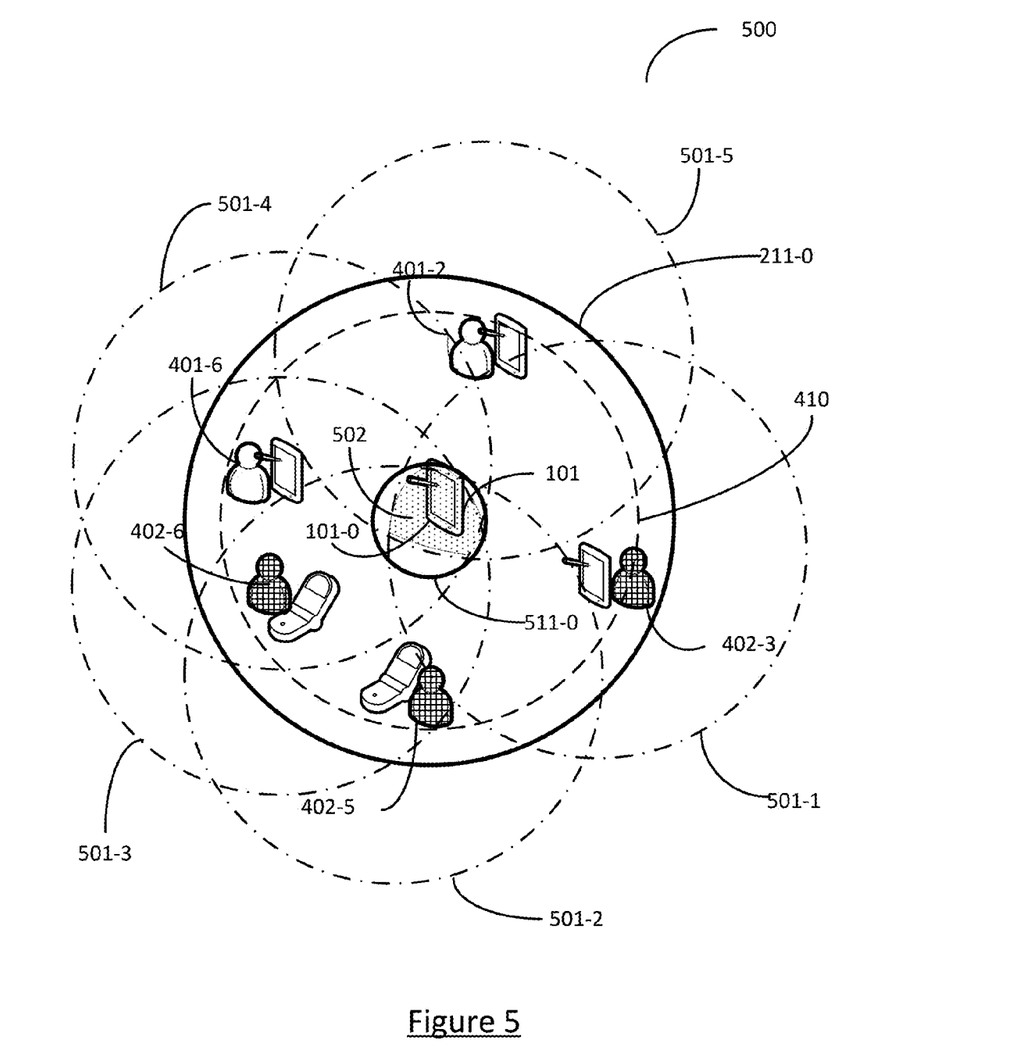
FIG. 5 illustrates the details of the system for generating, displaying, and implementing a geo-fence using the location determination of mobile devices within a location-based group according to an embodiment of the invention.

More specifically, FIG. 4 illustrates a system for generating, displaying, and implementing a geo-fence using the location determination of mobile devices (MHSDs) within a location-based group according to an embodiment of the invention. In FIG. 4, the system 400 includes the plurality of MHSDs 401-1 to 401-m (m>1), and 402-1 to 402-p (p>1). The MHSDs may be combined in groups that are explicitly registered and linked with a server 107 that tracks the location of the mobile devices. The MHSDs 401-1 to 401-m (m>1) may form a first explicit group and the mobile devices 402-1 to 402-p (p>1) may form a second explicit group. In one embodiment, the first explicit group may include the MHSD 101 and 401-1 to 401-m that are all members of a social networking group and that are being tracked by their location and the second explicit group may include the MHSD 101 and MHDs 402-1 to 402-p that may be members of another social group registered and enabled for tracking and monitoring as a group. For instance, the membership to these social networks include registration with one or more central servers as part of explicit groups, such as family group, friends group, extended family and friends group, sport and club groups etc. Moreover, the combinations of the first and second explicit groups may also form implicit groups of mobile devices that have common properties but are not linked by an explicit registration for tracking. For instance, implicit groups include all registered devices, all members of a club, etc.

Similar to FIG. 1, the tracking and monitoring server (TMSS) 107 included in the system 400 also links to each of the registered MHSDs over a network 106 (e.g., Internet, Cloud Network) to collect and transfer location data and proximity information. Specifically, the server 107 may request location data and the proximity information from each of the MHSDs 101, 401-1 to 401-m, and 402-1 to 402-p. For instance, the location data received from a first MHSD 101 includes a fixed location of the first MHSD 101. The MHSDs 101, 401-1 to 401-m, and 402-1 to 402-p may extract their location data, respectively, upon receiving the request from the server 107 by using its internal sensors and radios and by connecting to the Global Positioning System (GPS) 105. The MHSDs 101 401-1 to 401-m, and 402-1 to 402-p may also extract their location data, respectively, by using its internal sensors and radios and by triangulation using the Wireless (WiFi) towers 102-1, 102-2 and/or WiFi base station 103. Moreover, the proximity information received from the first MHSD 101 may include an identification of MHSDs that are within a proximity sensitivity radius of the first MHSD 101. Referring to FIG. 5, which illustrates in system 500 the details of the system 400 for increasing accuracy of a location determination of MHSDs within a location-based subgroup according to one embodiment of the invention, the first MHSD 101 has a proximity sensitivity circle 410 with a radius of 405 such that the proximity information received by the server 107 from the first MHSD 101 may include an identification of the proximate MHSDs being MHDSs 401-2, 401-6, 402-3, 402-5, and 402-6. The server is able to use the proximity information from the five devices 401-2, 401-6, 402-3, 402-5, and 402-6 in the proximity of the MHDS 101 to refine the position of the MHDS 101 by using the intersection of the proximity regions as shown in FIG. 5 according to one embodiment of the invention.

FIG. 5 illustrates the details of the system for generating, displaying, and implementing a geo-fence using the location determination of mobile devices within a location-based group according to an embodiment of the invention. FIG. 5 shows the system 500 illustrating the use of the proximity intersection using the proximity ranges 501-1 to 501-5 of the MHSDs 401-2, 401-6, 402-3, 402-5, and 402-6 that are in the proximity of MHSD 101 to refine the location of that MHSD 101. The MHSD 101 has an identified location 101-0 with an error circle 211-0 using the GPS 105-1, 105-2, refined by triangulation using the cell towers 102-1 and 102-2 and the Wi-Fi hotspot 103 as well as the location refinement using triangulation information using the registered explicit and implicit groups of devices of the MHSD 101. Further location refinement is performed using the intersection of proximity devices. FIG. 5 shows the MHSD 101 as having a proximity detection range 410.

As shown in FIG. 5, the fixed location of MHSD 101 is within the first MHDS 101's error circle (or sensor accuracy limit) 211-0. The MHSDs within the proximity range 410 include registered devices 401-2, 401-6, 402-3, 402-5, and 402-6 that are identified by the first MHSD 101. Similarly, the fixed location of MHDS 401-2, 401-6, 402-3, 402-5, and 402-6 are within their respective error circles (or sensor accuracy limits) 501-1 to 501-5. In some embodiments, the server (or TMSS) 107 may perform a proximity check which includes assessing the proximity information from each of the first MHSD 101, 401-2, 401-6, 402-3, 402-5, and 402-6 to determine and confirm that each of the mobile devices 401-2, 401-6, 402-3, 402-5, and 402-6 are proximate in location to the first MHSD 101. For instance, the TMSS 107 may check that first MHSD 101 is identified in the proximate information from the MHSD 401-2, 401-6, 402-3, 402-5, and 402-6, which indicates that first MHSD 101 is within the proximity sensor sensitivity radius of each of the mobile devices 401-2, 401-6, 402-3, 402-5, and 402-6. If the five devices are found to be in the proximity of each other using the proximity check, these devices can be considered to be in close by locations to or same location as the MHSD 101. In some embodiments, the MHSD 401-2, 401-6, 402-3, 402-5, and 402-6 that are found to be proximate to the first MHSD 101 may also be from the first MHSD 101's implicit and/or explicit groups.

In one embodiment, the TMSS 107 forms a subgroup of mobile devices that includes the mobile devices 401-2, 401-6, 402-3, 402-5, and 402-6 that provided proximity information identifying the first MHSD 101 are being within the proximity sensitivity radiuses of the MHSD, respectively. In some embodiments, the subgroup may also include the first MHSD 101. Using the subgroup, the TMSS 107 may then refine the fixed location of the first MHSD 101 to generate a refined location of the first MHSD 101. In one embodiment, as shown in FIG. 5, the refining of the fixed location of first MHSD 101 includes identifying an intersection 502 of the proximity sensor sensitivity of each of the mobile devices 101, 401-2, 401-6, 402-3, 402-5, and 402-6 that in the subgroup. Accordingly, it is determined that in order for the first MHSD 101 to be identified as proximate to devices in the subgroup, the location of the first MHSD 101 is location within the intersection 502. Thus, the TMSS 107 is able to obtain a refined location (e.g., within intersection 502) for the first MHSD 101. More specifically, rather than being based on only the first MHSD's 101 accuracy limit 211-0, the TMSS 107 is able to refine the location of the first MHSD 101 within an accuracy limit 502 of the proximity coverage 501-1 to 501-5 of the respective MHSDs 401-2, 401-6, 402-3, 402-5, and 402-6 to further refine the location fix 101-0 and reduce the error circle of the MHSD 101 from 211-0 to 511-0. The new error radius 511-0 now associated with the first MHSD 101 is much smaller than the first MHSD 101's sensor error radius 211-0.

In one embodiment, in order to further refine the fixed location of the first MHSD 101, the TMSS 107 may determine if a database 109 in FIG. 4 includes a location that is associated with the first MHSD 101 and that is within the intersection 502 or within a predetermined distance from the intersection 502. Alternatively, rather than being separate from the TMSS 107, the database 109 being checked for a location that is associated with the first MHSD 101 may also be a database that is included in the TMSS 107. Location data associated with each of the MHSD in the system 300 may be collected by the TMSS 107, which stores the data in a database memory. Referring back to FIG. 5, the location associated with the first MHSD 101 may include at least one of: (i) an explicit group location that is associated with an explicit group that includes the first MHSD 101, (ii) an implicit group location that is associated with an implicit group that includes the first MHSD 101, and (iii) a historic location that is associated with the first MHSD 101, wherein the historic location is a location previously frequented by the first MHSD 101.

The explicit group location and the implicit group location may respectively be locations where members of the explicit and implicit groups congregate such as clubs, schools, colleges, places of worship, sport facilities etc. As shown in FIG. 5, the subgroup 101, 401-2, 401-6, 402-3, 402-5, and 402-6 may include registered members from both explicit and implicit members that are proximate to MHSD 101. Though the subgroup in FIG. 4 is shown to include different mobile users, it is understood that the subgroup may be formed of multiple mobile devices belonging to a single user (e.g., tablet computers, mobile phones, smart watches etc.) in conjunction with other mobile devices identified by the proximity sensors of the mobile devices. Moreover, the historic location may be, for instance, a club, a school, a library or a sports facility, that was previously frequented by the MHSD 101. Further, the explicit group that includes first MHSD 101 may be, for example, a soccer team that organizes their games using social media. This explicit group may play their games at a specific soccer field. Accordingly, the location of that field may be an example of an explicit group location. The implicit group may be all sports teams that organize on a given social media site. Accordingly, the implicit group location may include the soccer fields that are frequented by any of mobile devices included in these sports teams.

In this embodiment, if the database includes the location that is associated with the first MHSD 101 and that is within the intersection 502 or within the predetermined distance from the intersection 502, the TMSS 107 sets the location associated with the first device as the refined location of the first MHSD 101. For instance, referring back to FIG. 3, if multiple buildings 203 and 204 are found to be within the intersection 502 or within the predetermined distance from the intersection 502, the TMSS 107 may determine whether there is a location associated with the first MHSD 101 that is located within the intersection 502 or within the predetermined distance from the intersection 502. If, for example, the building 203 is determined to be a gymnasium that the first MHSD 101 has previously frequented, the TMSS 107 may set the building $203_1$ as the refined location for first MHSD 101 and may send a signal to the display device 108 to display the refined location of the MHSD 101. In this embodiment, the TMSS 107 may also update the database to associate the refined location of the first MHSD 101 with the first MHSD 101. In some embodiments, the TMSS 107 may update the database 109 to associate the refined location with each of the mobile devices 101, 401-2, 401-6, 402-3, 402-5, and 402-6 in the subgroup of mobile devices.

In another embodiment, the TMSS 107 may refine the location of the mobile MHSD 101 by triangulating based on the location data from each of the MHSDs 101, 401-2, 401-6, 402-3, 402-5, and 402-6 that in the subgroup to obtain a refined location of the first MHSD 101.

By combining the proximity intersection information, from multiple MHSDs and by using triangulation methods as well as GPS location fixing, with historic data of frequented locations, the TMSS 107 is able to arrive at a very precise location of the tracked MHSD 101. Once a location fix with low error circle 501-0 has been established it is possible to enable geo-fences that can be used for protection and other such critical applications.

In some embodiments, the TMSS 107 may include a processor, memory storage, and a communication interface.

The communication interface may be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). In one embodiment, the communication interface may receive location data and proximity information from each of the mobile devices, respectively. The location data received from a MHSD 101 may include the location 101-0, which is the fixed location of the MHSD 101. The proximity information received from the MHSD 101 may include an identification of MHSDs proximate in location to the MHSD 101. For instance, the mobile device 101 may provide the identification of mobile devices 401-2, 401-6, 402-3, 402-5, and 402-6 that are within a proximity sensitivity radius 410 of the mobile device 101. The communication interface may also transmit a refined location of the mobile devices received from a processor to a display device 108. The communication interface may also receive geo-fence information that delineates the coordinates of a virtual boundary to be established.

The processor that is coupled to the communication interface may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor may be used to control the operations of the communication interface. For example, the processor may be coupled to the communication interface and executes software to control the wireless network communications functionality of the TMSS 107 (e.g. communicating with a network 106 to transmit and receive data to other components of system 400 (e.g., mobile devices) via the communication interface). In some cases, a particular function may be implemented as two or more pieces of software that are being executed by different hardware units of a processor.

In one embodiment, the processor is also coupled to the memory storage that may include one or more different types of storage such as hard disk drive storage, nonvolatile memory, and volatile memory such as dynamic random access memory. The memory storage may also include a database that stores location data associated with the plurality of mobile devices included in system 400. The database may also store membership data in explicit or implicit groups, member or mobile device characteristics, location identification, other location related information, historical subgroup member data and location based subgroup data. The memory device may also store instructions (e.g. software; firmware) which may be executed by the processor. In one embodiment, when the instructions stored in memory device are executed by the processor, the processor performs methods for increasing accuracy of a location determination of mobile devices within a location-based subgroup and methods for generating, displaying, and implementing a geo-fence using the location determination of mobile devices within a location-based group. In some embodiments, the processor may receive the location data and the proximity information from the communication interface, form a subgroup of MHSDs based on the proximity information from each of the plurality of MHSDs, and refine the fixed location of the first MHSD 101 to generate a refined location of the first MHSD 101. The processor may also control the functions of the communication interface by signaling to the communication interface to request from each of the MHSDs in the system 400 their location data and proximity information and by signaling to the communication interface to transmit the refined location of the first MHSD 101 to the display device 108 to be displayed. The methods for generating, displaying, and implementing a geo-fence using the location determination of mobile devices within a location-based group are discussed in further detail below.

In addition, various other peripheral units (not shown) may be connected to the TMSS 107 to form a computer platform, such as but not limited to keyboards, mouse, additional data storage units, printing units and/or display units. The processor, memory storage, and communication interface communicate to input devices and output devices via one or more communication links such as a bus. The communication links may also be other wired or wireless communication links. Though in FIG. 4, a single TMSS 107 is shown, it is understood that the TMSS 107 may be a virtual machine, with all the above capabilities, distributed over multiple servers or the cloud computing.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 6A:
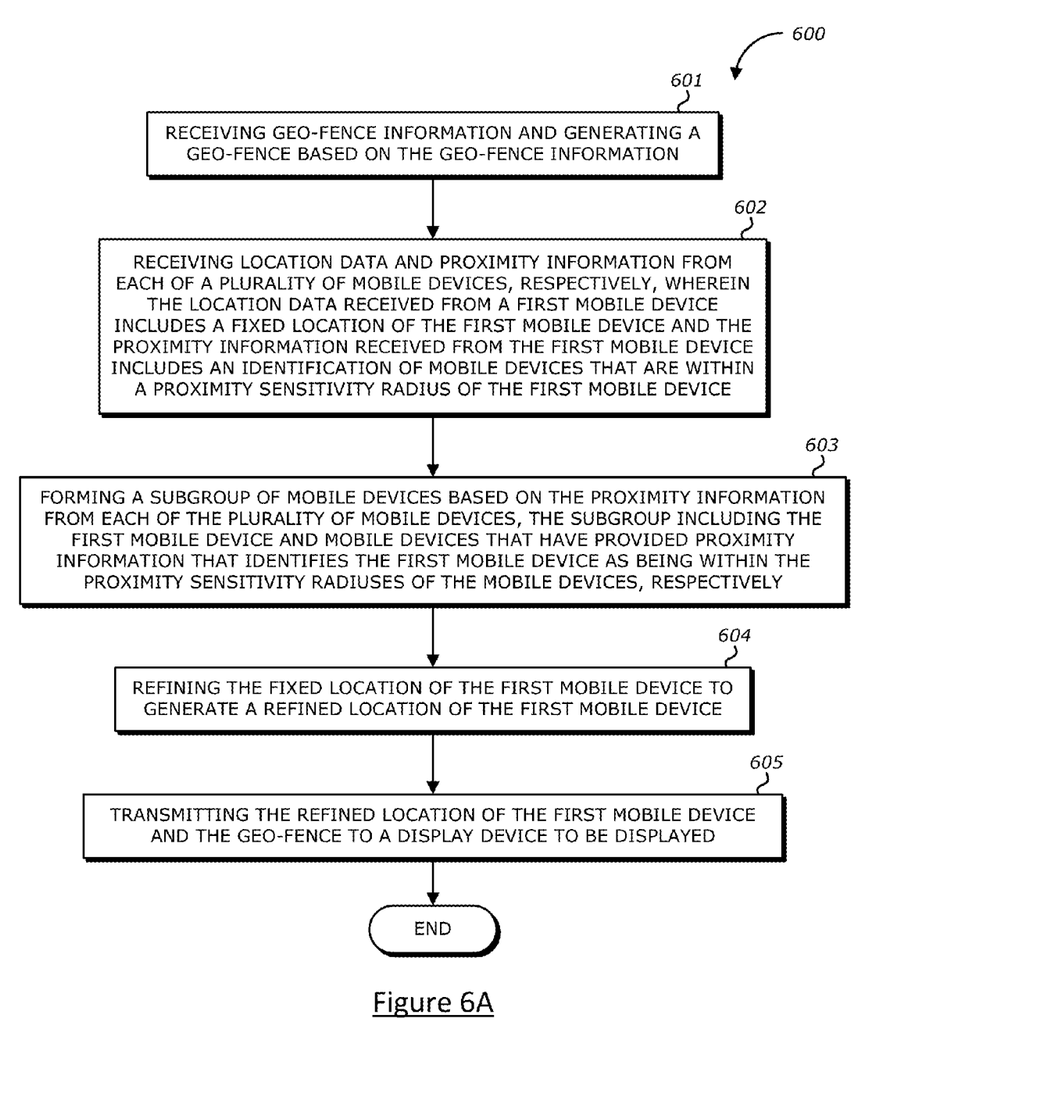
FIG. 6A illustrates a flow diagram of an example method for generating, displaying, and implementing a geo-fence using the location determination of mobile devices within a location-based group according to an embodiment of the invention.

FIG. 6A illustrates a flow diagram of an example method for generating, displaying, and implementing a geo-fence using the location determination of mobile devices within a location-based group according to an embodiment of the invention.

The method 600 starts at Block 601 with the TMSS 107 receiving geo-fence information and generating a geo-fence based on the geo-fence information received. At Block 602, the TMSS 107 receives location data and proximity information from each of a plurality of mobile devices, respectively. The location data received from a first MHSD 101 included in the MHSDs includes a fixed location of the first MHSD 101. The proximity information received from the first MHSD 101 includes an identification of MHSDs that are within a proximity sensitivity 406 radius of the first MHSD 101. At Block 603, the TMSS 107 may form a subgroup of MHSDs based on the proximity information from each of the plurality of MHSDs. The subgroup may include the first MHSD and the MHSDs that have provided proximity information that identifies the first MHSD 101 as being within the proximity sensitivity radiuses of the MHSDs, respectively. For instance, referring to FIG. 5, the proximity information from MHSD 401-2 includes an identification of first MHSD 101 as being within mobile device 401-2's proximity sensitivity radius that creates the sensor accuracy limit (or area) 501-5. Similarly, proximity information from MHSD 402-3 includes an identification of first MHSD 101 as being within the MHSD 402-3's proximity sensitivity radius that creates the sensor accuracy limit (or area) 501-1, proximity information from MHSD 402-5 includes an identification of first MHSD 101 as being within the MHSD 402-5's proximity sensitivity radius that creates the sensor accuracy limit (or area) 501-2, proximity information from MHSD 402-6 includes an identification of first MHSD 101 as being within the MHSD 402-6's proximity sensitivity radius that creates the sensor accuracy limit (or area) 501-3, and proximity information from MHSD 401-6 includes an identification of first MHSD 101 as being within the MHSD 401-6's proximity sensitivity radius that creates the sensor accuracy limit (or area) 501-4. Accordingly, the subgroup being formed in FIG. 5 may include first mobile device 101 and mobile devices 401-2, 401-6, 402-3, 402-5, and 402-6. At Block 604, the TMSS 107 may refine the fixed location of the first MHSD 101 to generate a refined location of the first MHSD 101. At Block 605, the TMSS 107 may transmit the refined location of the first MHSD and the geo-fence to a display device 108 for display. The display device 108 may display the geo-fence on a map as well as display the refined location of the first MHSD on the map. The TMSS 107 may also transmit the refined location of the first MHSD and the geo-fence information to a second mobile device for display. For instance, a child may be in possession of the first MHSD while a parent monitoring the child's location with respect to the geo-fence may be in possession of the second MHSD. Accordingly, the second MHSD may receive the refined location of the first MHSD and the geo-fence information and may display the geo-fence and the refined location of the first MHSD on a map on its display device. In some embodiments, the TMSS 107 generates an alert (e.g., sound, visual, image, text) to be displayed (or generated) by the display device 108 or by the second MHSD when the first MHSD 101's refined location crosses the geo-fence.

Accordingly, once the more accurate fix of the location of a MHSD is done with low error circle, the TMSS 107 is enabled to generate and display a geo-fence that can be used for critical applications. The geo-fence also is usable by the TMSS 107 to monitor and verify that the first MHSD under surveillance is not able to cross the geo-fence that is set up without causing accurate alarms to be generated.

Figure 6B:
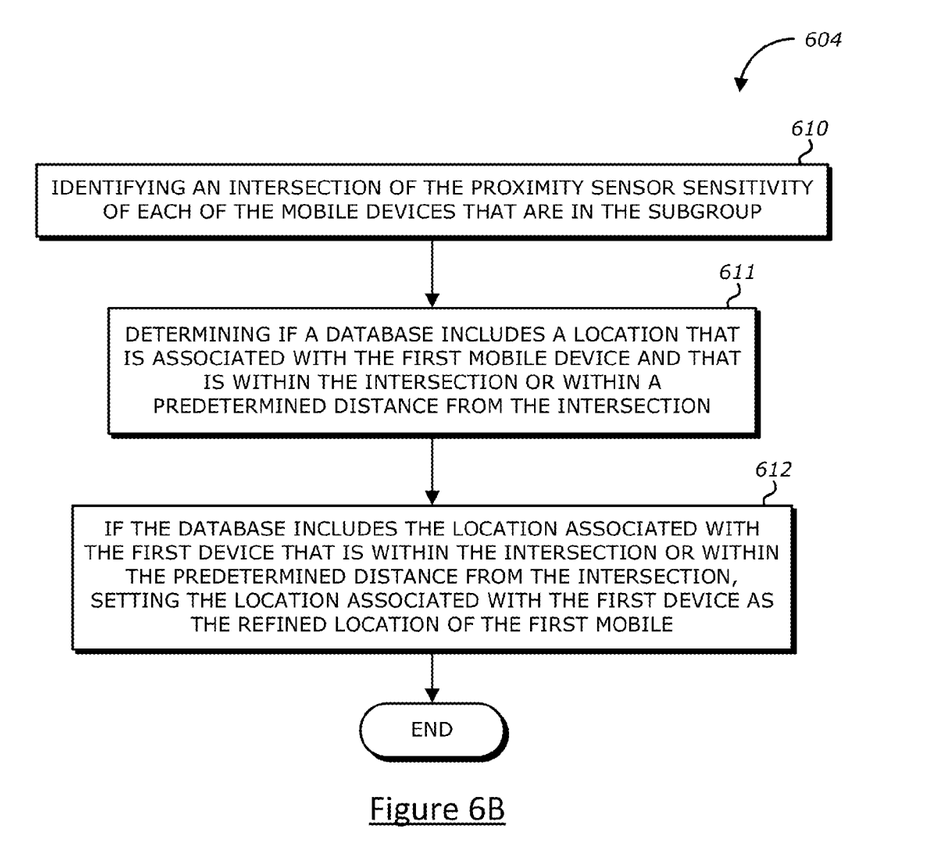
FIG. 6B illustrates a flow diagram of an example method for refining the location of a mobile device according to an embodiment of the invention.

FIG. 6B illustrates a flow diagram of an example method for refining the location of a MHSD according to an embodiment of the invention. In order to refine the location of the first MHSD 101 at Block 604 of FIG. 6A, the TMSS 107 may identify an intersection 502 of the proximity sensor sensitivity of each of the MHSDs 101, 401-2, 401-6, 402-3, 402-5, and 402-6 that in the subgroup at Block 610. At Block 611, the TMSS 107 may determine if a database 109 includes a location associated with the first MHSD 101 that is within the intersection 502 or within a predetermined distance from the intersection 502 and at Block 612, if the database 109 includes the location associated with the first MHSD 101 that is within the intersection 410 or within the predetermined distance from the intersection 410, the TMSS 107 may set the location associated with the first MHSD 101 as the refined location of the first MHSD 101. In one embodiment, the location associated with the first MHSD 101 that is stored in the database 109 may include historic data on the first MHSD 101's previously frequented locations. Accordingly, if the first MHSD 101's previously frequented location falls within the intersection 502, the TMSS 107 may set the previously frequented location as the refined location of the first MHSD 101.

Figure 6C:
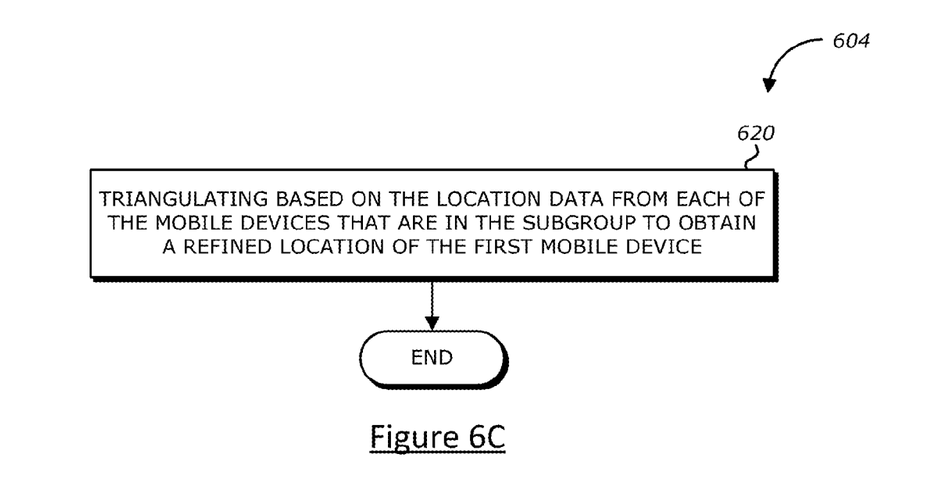
FIG. 6C illustrates a flow diagram of an example method for refining the location of a mobile device according to an embodiment of the invention.

FIG. 6C illustrates a flow diagram of an example method for refining the location of a MHSD according to another embodiment of the invention. In this embodiment, in order to refine the location of the first MHSD 101 at Block 604 of FIG. 6A, the TMSS 107 may triangulate based on the location data from each of the mobile devices that in the subgroup to obtain a refined location of the first MHSD 101 (Block 620).

Figure 7:
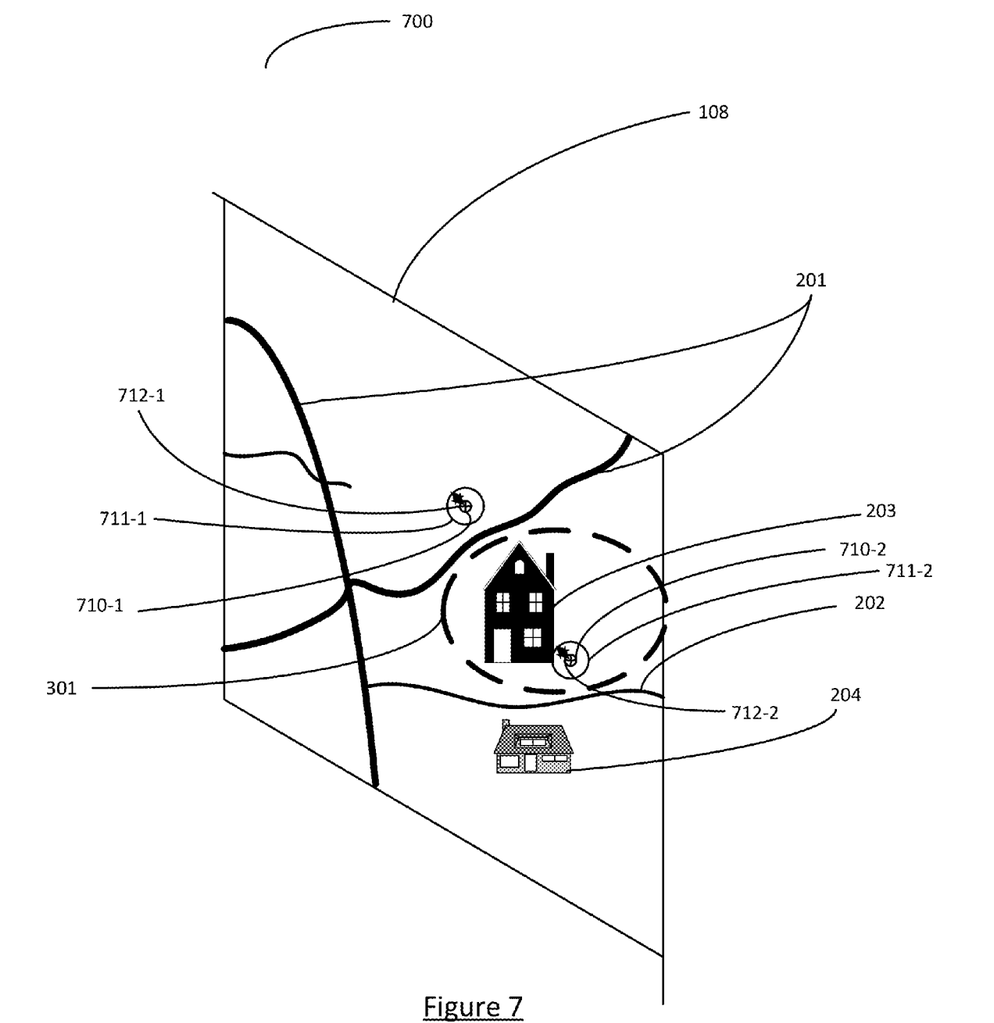
FIG. 7 illustrates the displayed location of the mobile device using the system for generating, displaying, and implementing a geo-fence using the location determination of mobile devices within a location-based group according to an embodiment of the invention.

FIG. 7 illustrates the displayed location of the MHSD using the system for generating, displaying, and implementing a geo-fence using the location determination of MHSD within a location-based group according to an embodiment of the invention.

In system 700 illustrates a map being displayed on the display device 108 that includes a critical geo-fence 301 that is set up to prevent MHSDs 710-1 and 710-2 from crossing the geo-fence 301. The map also illustrates the more precise location fix of a first MHSD 710-1 that is located outside the critical geo-fence 301 and a second MHSD 710-2 that is located inside the geo-fence 301. Each of the MHSDs 701-1 and 701-2 have error circles 711-1 and 711-2, respectively, having error ranges 712-1 and 712-2. As shown in FIG. 7, the MHSD 710-1 outside the geo-fence 301 and the MHSD 710-2 within the geo-fence 301 have a very small error circles 711-1 and 711-2. Hence, since the locations of the MHSDs 701-1 and 701-2 are more precisely fixed, the false responses triggered by MHSDs 701-1 and 701-2 crossing the geo-fence 301 are less likely to occur than in the prior art geo-fence implementations.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method for generating, implementing and displaying a geo-fence using the location determination of mobile devices within a location-based group comprising:
   receiving, by a processor, geo-fence information and generating, by the processor, a geo-fence based on the geo-fence information received;
   receiving, by the processor, location data and proximity information from each of a plurality of mobile devices, respectively, wherein the location data received from a first mobile device included in the plurality of mobile devices includes a fixed location of the first mobile device and the proximity information received from the first mobile device includes an identification of mobile devices that are within a proximity sensitivity radius of the first mobile device;
   forming by the processor a subgroup of mobile devices based on the proximity information from each of the plurality of mobile devices, the subgroup including the first mobile device and mobile devices that have provided proximity information that identifies the first mobile device are being within the proximity sensitivity radiuses of the mobile devices, respectively;
   refining, by the processor, the fixed location of the first mobile device to generate a refined location of the first mobile device, wherein refining the fixed location includes identifying an intersection of the proximity sensor sensitivity of each of the mobile devices that in the subgroup;
   transmitting, by the processor, the refined location of the first mobile device and the geo-fence to a display device; and
   generating and transmitting, by the processor, an alert to the display device when the refined location of the first mobile device crosses the geo-fence.

2. The method of claim 1, wherein the refining the fixed location of the first mobile device further comprises:
   determining by the processor, if a database includes a location associated with the first mobile device that is within the intersection or within a predetermined distance from the intersection; and
   if the database includes the location associated with the first device that is within the intersection or within the predetermined distance from the intersection, setting the location associated with the first device as the refined location of the first mobile.

3. The method of claim 2, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

4. The method of claim 1, wherein the refining, by the processor, the location of the first mobile device further comprises:

triangulating based on the location data from each of the mobile devices that in the subgroup to obtain a refined location of the first mobile device.

5. The method of claim 1, further comprising updating a database to associate the refined location of the first mobile device with the first mobile device.

6. The method of claim 1, further comprising:
displaying, by the display device, the refined location of the first mobile device and the geo-fence.

7. The method of claim 1, wherein the alert is at least one of a sound, an image, or a text.

8. An apparatus for generating, implementing and displaying a geo-fence using the location determination of mobile devices within a location-based group comprising:
a processor;
a communication interface to:
receiving geo-fence information, and
receive a location data and proximity information from each of a plurality of mobile devices, respectively, wherein the location data received from a first mobile device included in the plurality of mobile devices includes a fixed location of the first mobile device and the proximity information received from the first mobile device includes an identification of mobile devices that are within a proximity sensitivity radius of the first mobile device; and
a memory storage storing instructions that, when executed by the processor, causes the processor to:
receive the geo-fence information, the location data and the proximity information from the communication interface,
generate a geo-fence based on the geo-fence information,
form a subgroup of mobile devices based on the proximity information from each of the plurality of mobile devices, the subgroup including the first mobile device and mobile devices that have provided proximity information that identifies the first mobile device are being within the proximity sensitivity radiuses of the mobile devices, respectively,
refine the fixed location of the first mobile device to generate a refined location of the first mobile device, wherein refining the fixed location includes identifying an intersection of the proximity sensor sensitivity of each of the mobile devices that in the subgroup,
signal to the communication interface to transmit the refined location of the mobile device and the geo-fence to a display device, and
generate and transmit an alert to the display device when the refined location of the first mobile device crosses the geo-fence.

9. The apparatus of claim 8 further comprising:
a database storing data associated with a plurality of mobile devices,
wherein, when the processor executes the instructions stored in memory, the processor refines the fixed location of the first mobile device by:
determining if the database includes a location associated with the first mobile device that is within the intersection or within a predetermined distance from the intersection, and
if the database includes the location associated with the first device that is within the intersection or within the predetermined distance from the intersection, setting the location associated with the first device as the refined location of the first mobile.

10. The apparatus of claim 9, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

11. The apparatus of claim 8, wherein, when the processor executes the instructions stored in memory, the processor refines the fixed location of the first mobile device by:
triangulating based on the location data from each of the mobile devices that in the subgroup to obtain a refined location of the first mobile device.

12. The apparatus of claim 8, wherein when the processor executes the instructions stored in memory, the processor further:
update a database to associate the refined location of the first mobile device with the first mobile device.

13. The apparatus of claim 8, wherein the alert is at least one of a sound, an image, or a text.

14. A non-transitory computer-readable medium having stored thereon instructions that, when executed by a processor, causes the processor to perform a method of generating, displaying, and implementing a geo-fence using the location determination of mobile devices within a location-based group comprising:
receiving geo-fence information and generating a geo-fence based on the geo-fence information received;
receiving location data and proximity information from each of a plurality of mobile devices, respectively, wherein the location data received from a first mobile device included in the plurality of mobile devices includes a fixed location of the first mobile device and the proximity information received from the first mobile device includes an identification of mobile devices that are within a proximity sensitivity radius of the first mobile device;
forming a subgroup of mobile devices based on the proximity information from each of the plurality of mobile devices, the subgroup including the first mobile device and mobile devices that have provided proximity information that identifies the first mobile device are being within the proximity sensitivity radiuses of the mobile devices, respectively;
refining the fixed location of the first mobile device to generate a refined location of the first mobile device, wherein refining the fixed location includes identifying an intersection of the proximity sensor sensitivity of each of the mobile devices that in the subgroup;
transmitting the refined location of the first mobile device and the geo-fence to a display device; and
generating and transmitting an alert to the display device when the refined location of the first mobile device crosses the geo-fence.

15. The non-transitory computer-readable medium of claim 14, wherein the refining the fixed location of the first mobile device further comprises:
determining, by the processor, if a database includes a location associated with the first mobile device that is within the intersection or within a predetermined distance from the intersection; and
if the database includes the location associated with the first device that is within the intersection or within the predetermined distance from the intersection, setting the location associated with the first device as the refined location of the first mobile.

16. The non-transitory computer-readable medium of claim 15, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

17. The non-transitory computer-readable medium of claim 14, wherein the refining, by the processor, the location of the first mobile device further comprises:
   triangulating based on the location data from each of the mobile devices that in the subgroup to obtain a refined location of the first mobile device.

18. The method of claim 14, further comprising
   updating a database to associate the refined location of the first mobile device with the first mobile device.

19. The non-transitory computer-readable medium of claim 14, wherein the alert is at least one of a sound, an image, or a text.

* * * * *